Patented Oct. 1, 1946

2,408,615

UNITED STATES PATENT OFFICE 2,408,615

CATION EXCHANGE RESINS AND PRODUCTION THEREOF

James R. Dudley, Cos Cob, Conn., assignor to American Cyanamid Company, New York, N. Y., a corporation of Maine No Drawing. Application March 30, 1944, Serial No. 528,768

7 Claims. (Cl. 260—67)

This invention relates to cation active materials, that is, materials which exchange or extract by other means cations from fluid media.

An object of this invention is to provide a substantially water-insoluble resin having a relatively high capacity for the absorption of cations.

This and other objects are attained by reacting furfural with mineral acid halides and resinifying to a water-insoluble form.

The following examples are given by way of illustration and not in limitation. The proportions are in parts by weight, and the furfural is 95% pure.

Example 1

| | Parts |
|---|---|
| Sulfuryl chloride (4.0 mols) | 540 |
| Glacial acetic acid | 840 |
| Furfural (8.0 mols) | 808 |

The sulfuryl chloride is dissolved in the acetic acid, and the solution cooled in an ice bath. The furfural is then added slowly with stirring so that the temperature of the solution does not exceed 20° C. When the addition is complete the solution is black and upon standing overnight, a very soft black gel is formed. After standing for an additional day the gel becomes firm and hard.

The gel is reduced to particles of small size which are covered with water and allowed to stand overnight. The water is then drained off and the resin dried for 4 hours at 100° C. and evaluated. The final product exhibits a capacity for the absorption or exchange of cations from water equivalent to about 8,000 grains of calcium carbonate per cubic foot of resin, and the density of the material is about 12.2 pounds per cubic foot.

Example 2

Example 1 is repeated but instead of soaking the small-sized particles of the gel, they are suspended in water and the mixture boiled for 4 hours. The water is then drained off and the resin dried for 4 hours at 100° C. The final product exhibits a capacity for the absorption or exchange of cations from water equivalent to about 7,100 grains of calcium carbonate per cubic foot of resin and the density of the material is about 10.5 pounds per cubic foot.

Example 3

Example 1 is repeated but instead of soaking the gel particles in water overnight, dry steam is passed through the resin for 4 hours. After this treatment the resin is dried for 4 hours at 100° C. and the final product has a capacity for the absorption of cations from water equivalent to about 9,600 grains of calcium carbonate per cubic foot of resin. The density of the material is about 13.2 pounds per cubic foot.

Example 4

| | Parts |
|---|---|
| Sulfuryl chloride (4.0 mols) | 540 |
| Glacial acetic acid | 840 |
| Furfural (10.0 mols) | 1010 |

As in Example 1 the sulfuryl chloride is dissolved in the acetic acid, this solution is cooled in an ice bath, and the furfural is then added slowly with stirring so that the temperature of the solution does not exceed 20° C. The solution is black when the addition is complete and a hard black brittle gel is formed on standing overnight.

The gel is broken into small particles which are covered with water and allowed to stand overnight. The water is drained off and the resin dried for 4 hours at 100° C. The final product has a capacity for the absorption of cations from water equivalent to about 9,900 grains of calcium carbonate per cubic foot of resin and the density of the material is about 17.3 pounds per cubic foot.

Example 5

The procedure of Example 4 is followed except that instead of soaking the gel particles overnight they are suspended in water and the mixture is boiled for 4 hours. The water is then drained off and the resin dried for 4 hours at 100° C. The final product exhibits a capacity for the absorption of cations from water equivalent to about 15,600 grains of calcium carbonate per cubic foot of resin and the density of the material is about 15.6 pounds per cubic foot.

After evaluation the resin is redried for 17 hours at 145° C. to give a product having a capacity equivalent to about 12,900 grains of calcium carbonate per cubic foot of resin and a density of 7.7 pounds per cubic foot.

Example 6

The procedure of Example 4 is followed except that instead of soaking the gel particles overnight, dry steam is passed through the resin for 4 hours as in Example 3. The resin is then dried for 4 hours at 100° C. and the final product found to have a capacity for the absorption or exchange of cations from water equivalent to about 14,100 grains of calcium carbonate per cubic foot of resin. The resin has a density of 16.0 pounds per cubic foot.

Example 7

| | Parts |
|---|---|
| Sulfuryl chloride (4.0 mols) | 540 |
| Glacial acetic acid | 840 |
| Furfural (12.0 mols) | 1212 |

The sulfuryl chloride is dissolved in the acetic acid, the resulting solution cooled in an ice bath, and the furfural is then added slowly with stirring so that the temperature of the solution does not exceed 20° C. Upon standing overnight a gel is formed which is harder and more brittle than that of Example 4.

The gel is broken into small-sized particles which are cured in an oven for 4 hours at 50° C. and then for an additional 4 hours at 100° C. The cured resin particles are then covered with water and allowed to stand overnight. The water is drained off and the resin dried for 4 hours at 100° C.

The final cured and hydrolyzed product has a capacity for the absorption or exchange of cations from water equivalent to about 18,300 grains of calcium carbonate per cubic foot of resin and a density of 18.2 pounds per cubic foot.

Example 8

The procedure of Example 7 is repeated except that instead of soaking the cured resin particles overnight they are suspended in water and boiled for 4 hours. Following this the water is drained off and the resin is dried for 4 hours at 100° C. The final product exhibits a capacity for the absorption or exchange of cations from water equivalent to about 18,100 grains of calcium carbonate per cubic foot of resin and has a density of 18.4 pounds per cubic foot.

Example 9

A hard brittle gel is prepared as described in Example 7. Instead of curing small-sized particles of this gel by heating in an oven for a period of time, they are covered with water and allowed to stand overnight. The water is then drained off and the resin particles dried for 4 hours at 100° C.

The final product has a capacity for the absorption or exchange of cations from water equivalent to about 11,700 grains of calcium carbonate per cubic foot of resin and a density of 22.2 pounds per cubic foot.

Example 10

Example 7 is repeated except that the curing step is omitted. The hard brittle gel particles are suspended in water and boiled for 4 hours. After draining off the water, the resin is dried for 4 hours at 100° C. and evaluated. The final product has a capacity for the absorption of cations from water equivalent to about 10,800 grains of calcium carbonate per cubic foot and a density of 23.2 pounds per cubic foot.

Example 11

Example 7 is repeated except that the gel is not cured but particles thereof instead are treated by passing dry steam therethrough for 4 hours as in Example 3, and the resin is then dried for 4 hours at 100° C.

The final product has a capacity for the exchange of cations in water equivalent to about 12,800 grains of calcium carbonate per cubic foot, and the density of the material is about 21.7 pounds per cubic foot.

Example 12

| | Parts |
|---|---|
| Phosphorus oxychloride (0.5 mol) | 77 |
| Glacial acetic acid | 105 |
| Furfural (1.0 mol) | 101 |

The phosphorus oxychloride is dissolved in the acetic acid and the solution cooled to about 3° C. The furfural, cooled to about 5° C., is then added. The solution is black and after standing overnight a soft brittle rubbery black gel is formed. Upon warming up, an exothermic reaction occurs in which acetic acid and hydrochloric acid fumes are distilled from the material. Upon cooling a very hard brittle gel is obtained.

Small-sized particles of the gel are covered with water and allowed to stand for 4 hours. Steam is then bubbled into the mixture for 4 hours, the water is drained off, and the resin is dried for 4 hours at 100° C. The final product has a capacity for the absorption of cations from water equivalent to about 16,100 grains of calcium carbonate per cubic foot of resin and the density of the material is about 17.5 pounds per cubic foot.

Example 13

| | Parts |
|---|---|
| Phosphorus oxychloride (0.5 mol) | 77 |
| Glacial acetic acid | 105 |
| Furfural (1.5 mols) | 152 |

The procedure of Example 12 is followed throughout. The brittle black gel, somewhat firmer than that formed in Example 12, has a capacity for the absorption of cations from water equivalent to about 17,300 grains of calcium carbonate per cubic foot of resin. The density of the material is about 19.6 pounds per cubic foot.

The mineral acid halides are preferably resinified with furfural alone although a minor portion of the furfural may be replaced by other aldehydes, particularly formaldehyde, a polymer of formaldehyde or a substance yielding formaldehyde. Other aldehydes which may be used include acetaldehyde, butyraldehyde, heptaldehyde, crotonaldehyde, acrolein, benzaldehyde, etc.

The resins of the present invention may be cured by heating at a temperature ranging from room temperature to about 150° C. for from several hours to a day.

The reactions of furfural with mineral acid chlorides are necessarily carried out in anhydrous solvents to prevent hydrolysis of the chlorides before sulfonation or phosphonation takes place. The reactions involved in the preparation of these resins are undoubtedly complex. No attempt has been made to determine the mechanism and I do not wish to be limited to any particular theory thereof. However, I believe that the rapidity, and in some cases the violence, of the reaction in its last stages may be explained in the following manner. Elimination of water in all probability takes place during the condensation leading to the formation of a resin from furfural. The water thus liberated will react with the acid chlorides (or the furfural acid chlorides) with the formation of a mineral acid and the liberation of heat. The acid thus formed serves to accelerate further condensation and the heat likewise has the effect of accelerating the reactions which are taking place. While the rate of reaction may be slow initially, these factors cause the speed of reaction to increase progressively until the reaction becomes violent.

My new resinous materials may be used alone or in admixture with other cation active materials. Furthermore, my resins may be applied before gelation to a suitable carrier such as diatomaceous earth, clays, charcoal, etc. In this way, the active resin is spread on the surface of a relatively inert material and this enables one to employ a smaller quantity of resin than otherwise to obtain the same active area.

The granular resinous materials prepared according to my invention, and particularly those having a particle size less than 8 mesh, are useful in the removal of cations from fluid media, especially aqueous solutions. The resins may be used in the hydrogen-activated form to remove cations from solutions of bases. My resinous cation-active materials may also be employed as exchange materials in accordance with the principles applied to the use of the natural and synthetic zeolites. Thus, the resin may be activated with a sodium salt such as sodium chloride and upon contact with a solution containing calcium, magnesium or other cations, an exchange of the latter ions for the sodium ions takes place.

The activating solutions or regenerating solutions are dilute acid solutions or dilute salt solutions, e. g. about 0.2%-10% of sulfuric acid, hydrochloric acid, sodium chloride, potassium chloride, etc.

To be sufficiently insoluble for practical use in the art of water purification, a resin should have a sufficiently low solubility that it will not be dissolved away rapidly by the solution to be treated. Thus, water should not dissolve more than about one part of resin in 1,000 parts of water when passed through a bed of resin (after the first cycle comprising an activation, exhaustion and reactivation of the resin).

My resinous materials are useful for a wide variety of purposes. Some of the uses which may be mentioned by way of example are: water purification; purification of sugar juices; purification of water from lead pipes; removal of heavy metal ions from food, beverages and pharmaceutical products; decolorization of solutions containing coloring matters, etc. My condensation products may also be employed to recover valuable metal cations from dilute solutions, e. g., gold from sea water, chromium from chrome tanning liquors, silver from photographic baths, etc. Another important application of my materials is in the absorption or adsorption of gases such as ammonia, amines, e. g., triethyl-amine, methyl amine, etc., from fluid media either dissolved in a liquid or from vapors.

My furfural mineral acid halide condensation products may be used in reduction processes such as in reducing ferric ions to ferrous ions, magnesium ions to a lower degree of oxidation and other cations to the metallic state, as well as for many other reduction purposes.

Obviously many variations in the processes and compositions described above may be made without departing from the spirit and scope of the invention as defined in the appended claims.

I claim:

1. A granular water-soluble composition of matter comprising the hydrolyzed product of reaction of a mixture including furfural and a mineral acid halide selected from the group consisting of sulfuryl chloride and phosphorus oxychloride and having a particle size of less than about 8 mesh.

2. A process which comprises condensing furfural and a mineral acid halide selected from the group consisting of sulfuryl chloride and phosphorus oxychloride, gelling the resulting condensation product, heating the gel thus obtained until it is insoluble in water, and hydrolyzing the water-insolubilized gel.

3. A process which comprises condensing furfural and a mineral acid halide selected from the group consisting of sulfuryl chloride and phosphorus oxychloride, gelling the resulting condensation product, hydrolyzing the gel thus obtained, and heating the hydrolyzed gel until it is insoluble in water.

4. A granular water-insoluble composition of matter suitable for the removal of cations from fluid media which comprises the hydrolyzed product of reaction of a mixture including furfural and sulfuryl chloride, and having a particle size of less than about eight mesh.

5. A granular water-insoluble composition of matter suitable for the removal of cations from fluid media which comprises the hydrolyzed product of reaction of a mixture including furfural and phosphorus oxychloride and having a particle size of less than about eight mesh.

6. A process which comprises condensing furfural and a mineral acid halide selected from the group consisting of sulfuryl chloride and phosphorus oxychloride, to produce a reaction product, gelling said product, hydrolyzing said product, heating said product until insoluble in water and granulating said product after gelation to a particle size of less than about eight mesh.

7. A process which comprises condensing furfural and phosphorus oxychloride, gelling the resulting condensation product, hydrolyzing the gel thus obtained, heating the hydrolyzed gel until it is insoluble in water, and granulating said gel to a particle size less than about eight mesh whereby a product is obtained suitable for the removal of cations from fluid media.

JAMES R. DUDLEY.